United States Patent Office 2,987,416
Patented June 6, 1961

2,987,416
METHOD AND APPARATUS FOR FORMING CERAMIC SURFACE LAYERS
Hubertus Wessel, Malteserstr. 18, Bonn, Germany
No Drawing. Filed July 23, 1956, Ser. No. 599,371
21 Claims. (Cl. 117—64)

The present invention relates to a method and an apparatus for forming ceramic surface layers and more particularly it relates to the forming of a ceramic surface layer on a support such as a building element or the like.

The process of the present invention may be illustrated in a simplified flow diagram as follows:

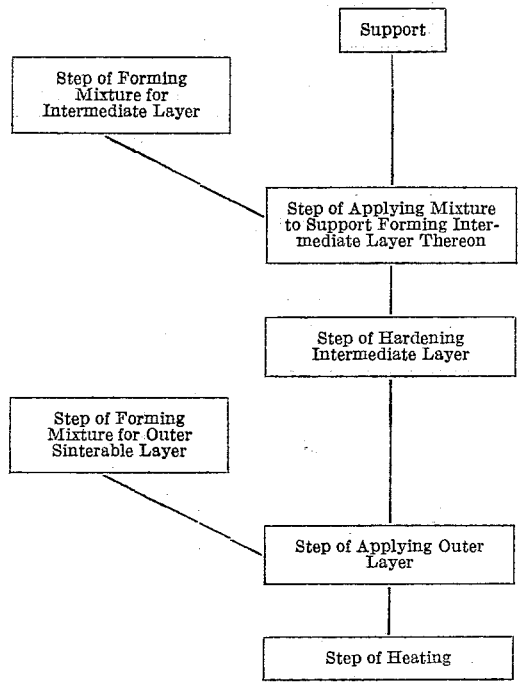

In order to apply to masonry or concrete a surface of low water absorption and at least limited acid resistance it is customary to cover the walls or the like made of masonry or concrete with prefabricated tiles of ceramic sintered or vitrified material. Thus it is necessary to first produce tiles or the like in suitable production facilities, then to transport the ceramic tiles or similar surface forming elements to the building location, and there to apply the tiles to the surface of the building element, such as a wall which has to be covered with a hygienic, washable and chemically resistant surface layer. A great number of unrelated production steps have to be performed at various locations such as the production of the tiles or the like in a suitable plant, the transportation of the finished tiles to the building site and finally the application of the tiles or the like to the building element which has to be provided with a ceramic, hygienic surface layer. Thus considerable effort is required which is also expressed in the working time and monetary expenses involved.

It is therefore an object of the present invention to overcome the difficulties and disadvantages in the method of applying sintered or vitrified ceramic surface layers to building elements and the like.

It is another object of the present invention to provide a heating device which is specially adapted for the forming of ceramic surface layers on building elements or other supports.

It is yet another object of the present invention to provide a method for forming a hygienic and chemically resistant ceramic surface layer on walls and the like which can be executed in a simple and economical manner.

It is still another object of the present invention to provide a method of forming a ceramic surface layer on concrete, masonry or the like which method can be performed in its entirety at the building site and does not require the prefabrication of ceramic elements.

Other objects and advantages of the present invention will become apparent from a further reading of the description and the appended claims.

With the above and other objects in view the present invention mainly consists in a method of forming on a support a ceramic surface layer, comprising, in combination, the steps of applying to the surface of the support an intermediate layer comprising a first ceramic-forming material, thereby adhering the intermediate layer to the surface of the support, applying to the outer face of the intermediate layer an outer layer of a second ceramic-forming material adapted to be at least sintered by heating, and heating the outer layer so as to at least sinter the same, whereby the outer layer is firmly adhered to the intermediate layer and simultaneously a ceramic surface is formed on the support.

The present invention also includes a heating device adapted to heat a ceramic-forming layer formed on a support so as to at least sinter the ceramic-forming layer, comprising, in combination, a heating box being open at one end, a plate of ceramic material arranged in the heating box substantially parallel to the open end thereof, a plurality of electric heating members arranged on the ceramic plate facing the open end of the heating box, and means for attaching the electric heating members to the ceramic plate and for passing electric current through the electric heating members.

According to the present invention ceramic surface layers, i.e., surface layers of ceramic-forming material which has been heated so as to form a sintered, fritted, glazed or vitrified ceramic, are formed by first applying to a support such as a building element, for instance a concrete or masonry wall, an intermediate layer of a first ceramic-forming material which preferably contains a filler material, and then forming on this intermediate layer an outer layer of a ceramic-forming material which outer layer is heated to the temperature required for causing vitrification or sintering thereof. The heat required for forming the ceramic outer layer may be either applied to the outer surface of the material of the outer layer, or may also be applied throughout the outer layer material as will be described in more detail further below.

The first ceramic-forming material of the intermediate layer will be sufficiently heated when heat is applied to the second ceramic-forming material of which the outer layer is formed, to cause crystallization and in this manner a ceramic bond between the outer layer and the intermediate layer. In this manner, i.e., by interposition of the ceramic intermediate layer between the building element and the ceramic outer layer, it is possible to form glasses, or vitrified or sintered surfaces on building elements of bare brickwork or concrete or the like. It is also possible to either form in this manner a continuous ceramic surface, or to form a ceramic surface only on portions of the building element so as, for instance, to cover the joints between individual bricks of brick masonry. The ceramic surfaces which can be formed on walls and the like according to the present invention are suitable for the outer walls of buildings as well as for internal walls.

Thus it is possible according to the present invention to protect edifices of all kinds against the action of chemical substances such as acids or bases, acidic waste water, humic acids such as for instance are present in acidic soil, sea water or other substances which might attack the building elements.

The intermediate layer is used like a ceramic mortar on which the ceramic-forming material of the outer layer is applied and a ceramic surface formed therefrom by application of heat. The ceramic-forming material of the outer layer may contain suitable coloring material so as to form any desired color in the finished ceramic surface. The outer layer upon application of heat thereto forms, due to its vitrifying or sintering constituents, a homogeneous and dense surface of such hardness that it ordinarily cannot be scratched. In order to obtain special visual or technical effects, to avoid cracks formed by reduction in volume of the material or in order to improve reflection of ultra-violet rays, a variety of substances such as metals or metal compounds as silicon, aluminum, magnesium, iron, their compounds as oxides, silicates, and/or their alloys in quantities up to 30% of weight or also refractory materials like asbestos, graphite, vermiculite, or the like may be distributed through and embedded in the ceramic-forming material of which the outer layer is formed.

The heat energy which is required for forming a ceramic, vitrified or sintered surface may be applied in any suitable manner such as radiant heat, convection heat, heat formed by electrical resistance or high frequency. It is also possible to apply the ceramic-forming outer layer simultaneously with applying heat thereto. During the firing of the outer ceramic-forming layer or prior to the firing thereof, an alignment of material embedded therein can be achieved by exerting mechanical, magnetic or electrical forces thereon.

In order to avoid bubble formation or other undesirable effects which can be caused by gas formation during the application of heat to the outer layer, it is advantageous to use in the ceramic-forming layers raw materials which contain as few gas forming constituents as possible.

Accordingly, it is preferred to use as filler material in the intermediate layer preheated substances such as blast furnace slag, pumice, chamotte, or the like.

As stated further above, the customarily used ceramic elements such as tiles and the like have to be produced in special industrial facilities which are constructed for this purpose, and consequently have to be produced at predetermined locations which are distant from the place where a ceramic surface has to be applied to a building portion. According to the present invention it is now possible to produce the ceramic surface layer at the place of its final use by means of transportable mixing and heating devices. It is now possible to produce batches of the desired quantity and the desired specific compositions of the ceramic-forming material with previously prepared and preburned filler materials such as blast furnace slag, and to provide a mixture of ceramic-forming material which with respect to its qualities, for instance distribution of particle sizes, is exactly suitable for the specific job at hand.

Blast furnace pumice stone slag has been found especially suitable as a filler material for the first ceramic-forming material of which according to the present invention the intermediate layer is formed. The special advantages of this filler material are its low heat conductivity and its high porosity. Blast furnace pumic stone slag is foamed blast furnace slag of approximately the following composition:

| | Percent by weight |
|---|---|
| Silicon dioxide | 30–36 |
| Alumina | 10–16 |
| Limestone | 40–45 |
| Magnesia | 4–8 |

Blast furnace pumice slag, due to its chemical compositions increases the liquification of the ceramic-forming materials under influence of heat and also improves the adherence between body and glaze. Furthermore, the incorporation of blast furnace pumice slag greatly reduces the danger of formation of so-called hair cracks.

The intermediate layer may also be formed of a mixture of preheated materials such as blast furnace pumice slag, with sand or glass powder and with a ceramic-forming material such as chamotte and bentonite. The ceramic-forming material may be also replaced at least partially with special cement such as alumina cement, blast furnace cement, magnesia cement. The intermediate layer may also contain metal or metal compounds as silicon, aluminum, magnesium, iron, their compounds as oxides, silicates, and/or their alloys in quantities up to 30% of weight.

The intermediate layer may for instance be composed and applied as follows:

60 parts of blast furnace pumice stone slag and 25 parts of masonry sand are ground together and passed through a sieve of 2,500 mesh per square centimeter. To the thus obtained powder are added 15 parts of a ceramic mixture containing 45% clay, 28% quartz and 27% feldspar. A liquid consisting of 2 parts of commercial water glass and 1 part of water is used for forming a paste from the above mixture which can be applied with a trowel. The mortar-like material is now applied to the support with a trowel or the like in a thickness of up to 10 centimeters. The surface of the thus formed intermediate layer is then smoothened and after hardening of the intermediate layer, the outer layer may be applied thereto. The finished outer layer may consist of a vitrified or sintered ceramic body in which a metal, asbestos or other high temperature resistant material may be embedded. The outer layer may also be formed of materials of the earthenware or stoneware type. The outer layer is applied to the outer face of the intermediate layer by spraying, dusting, throwing, troweling, or painting, and it is then firmly connected with the intermediate layers by application of heat. It has been found that depending on the purpose of the outer layer as either a vitrified or a sintered surface, two types of outer layers are most suitable. One type of outer layer is directly applied as a cover layer onto the intermediate layer, while the other type of outer layer is applied after interposition of an engobe or slip layer between the intermediate layer and the subsequently applied outer layer.

When the viscosity of the material to be used for forming the outer layer or the engobe layer is too high to allow its application, it is possible to temporarily reduce the viscosity of the material by application of sonic energy (the term "sonic energy" as used herein to include ultrasonic energy) and thus to obtain a material which similarly to thixotropic materials has a temporarily reduced viscosity (see Example 2). The material is then applied while being in this state of reduced viscosity. The temperature to which the ceramic-forming outer layer is to be heated depends on the heat resistance of the outer layer and on the desired degree of formation of a recrystallized border layer between the intermediate layer and the outer layer. Thus it depends on the degree of firm adherence which is desired. The intermediate layer is preferably highly porous in order to improve adherence between the same and the outer layer and also in order to increase the heat insulating properties of the intermediate layer during the heating of the glaze-forming outer layer.

The formation of a boundary layer connecting the outer layer with the layer directly underneath the same, is improved by a relatively high content of fluxing material in the material of which the outer layer is formed, for instance by admixing feldspar rich in alkali or by admixing low melting materials such as borax and the like. In this border layer between the outer layer and intermediate layer, due to the presence of fluxing materials in the outer layer, a partial vitrification of adjacent particles of the intermediate layer takes place. Furthermore the material of which the outer layer is formed can be so composed that it becomes flowable under the influence of heat and that it consequently enters into the pores and capillaries of the intermediate layer. In this manner an additional mechanical adherence between outer and intermediate layers is achieved.

The material for the outer layer consists of a mixture of compounds which melt or sinter at relatively low temperatures such as for instance boron compounds, aluminum oxide, silicon oxide, sodium oxide and potassium oxide which may be prepared by mixing only or by fritting. The mass may also contain metal oxides which after firing will create color and reflection effects.

A dry or wet mixture suitable to form the outer layer may be prepared for instance according to the following formula:

| | Parts by weight |
|---|---|
| $SiO_2$ | 1.98 |
| $Al_2O_3$ | 0.22 |
| PbO | 0.88 |
| $K_2O$ | 0.05 |
| CaO | 0.07 |

The mixture is then dried, molten, and after cooling for about 30 hours, ground in a wet mill. The thus obtained fritted material forms a ceramic glaze and has a melting point of about 800° C. It may now be combined with adhesives such as dextrine, water glass, syrup or the like and by spraying, brushing, throwing, etc. applied in suitable consistency onto the intermediate layer. Thereafter it is vitrified or sintered and simultaneously firmly adhered to the intermediate layer by the application of heat. The thus formed ceramic outer layer has a thickness up to about 1 mm. when forming a vitrified body, and a thickness of up to about 3 mm. when forming a sintered body.

When the surface of the intermediate layer is of such roughness that the unevenness would become apparent even through the outer layer, an interposed layer can be formed between the intermediate layer and the outer layer, which interposed layer may for instance have the following composition:

| | Percent by weight |
|---|---|
| Kaolin | 51.25 |
| Clay | 13.35 |
| Quartz sand | 31.92 |
| Feldspar | 3.48 |

The application of this interposed layer or engobe layer is effected similarly to the application of the outer layer.

By changing the relative quantity of feldspar and kaolin or clay in the material of which this interposed layer is formed, the interposed layer will at a temperature between 600 and 1,250° C. possess the qualities which are required of the vitrifying or sintering outer layer.

It is an advantage of the method of the present invention that in forming building elements or entire building units with ceramic surfaces one is not limited to the use of prefabricated individual building blocks such as ceramic tiles and the like. According to the present invention, the ceramic surface layer is applied over the entire area which is to be so covered. The process is completed as soon as the outer layer has sufficiently cooled, after being transformed into a ceramic layer by application of heat. Such treated outer walls of buildings are capable of being easily cleaned, which is of special importance in areas where the atmosphere contains large quantities of dirt-forming materials.

While the present invention is primarily directed to the forming of ceramic surfaces on building elements of larger configuration or on complete building or construction units, it is also possible to form ceramic surfaces according to the method of the present invention on individual bricks, pumice breeze blocks or the like, and the ceramic surface on such individual bricks or the like can be formed prior or after the same has been incorporated in a larger building element or unit. The ceramic surface which is produced according to the method of the present invention is in no way dependent on the dimensions of the building unit on which it is to be produced.

When it is desired to incorporate in the outer layer a material which will give to the outer layer a specific ornamental appearance, it is possible to embed such material in, or to apply such material to the outer layer before or during the heating of the same. Such ornamental materials which may for instance create the appearance of tapestry, or of a design or of a mirror in the completed ceramic outer layer, may be applied to the ceramic-forming outer layer prior to heating of the same by brushing or by other mechanical or electrical methods of application which per se are well known in the art. Such ornamental materials may be applied in cold or hot condition.

The application of heat is preferably accomplished by radiation. For applying radiant heat, a radiator such as an electric heating spiral, heating rods, or an oven which may be heated by gas or electricity may be used. Preferably such oven is provided with means for moving the same in any desired direction. The oven is placed in suitable distance from the ceramic-forming outer layer and the outer layer exposed to heat emanating from the oven is recrystallized, i.e sintered or vitrified. The time period during which heat is to be applied depends on the composition of the outer layer and on the composition of the layer beneath the outer layer and usually amounts to between 1 and 30 minutes. The period of time during which heat from the oven is to be applied to the outer layer may be reduced, if waste heat from the oven is conducted to portions of the outer layer prior to the exposure of these portions to the full heat of the oven. The waste heat will then remove mechanically and chemically bound water from the outer layer thus reducing the period of time required for the subsequent sintering or vitrifying of the layer.

Since according to the present invention the temperature of the radiant heat which is applied to the outer layer is of decisive importance for firmly adhering the outer layer to the intermediate layer or the outer layer to the engobe layer and the engobe layer to the intermediate layer, while adherence of the intermediate layer on the underlying support of building elements is unfavorably influenced by the application of heat, the degree of ultrared absorbtion of the various layers and of the heat conductivity of the same are determining factors for the length of time during which heat is to be applied. The source of heat which periodically or continuously is moved substantially parallel to the outer layer and with a predetermined speed so as to expose each portion of the outer layer to heat for the required length of time, may for instance be formed by a transportable oven which is open on one side. As such, for instance a box of 25 centimeters width and height and 15 centimeters depth, has given good results. Heating rods are arranged in the box in ceramic supports. The heating rods are to have a maximum radiation temperature of about 1,350° C. and preferably connected in series. By suitable arrangement of a reflector between the heating rods and the closed end of the box, the radiation emanating from the heating rods is directed towards the open end of the box and thus, when the oven is in position, towards the outer, ceramic-forming layer. The reflector has to be of a heat resistant material. The major portion of radiation which is not primarily directed towards the open end of the box and thus towards the layer of ceramic-forming material is then collected on the reflector and reflected by the same towards the open end of the box and the ceramic-forming material which is to be heated. The reflector further causes an even distribution of heat over the entire area of the open end of the box so that the amount of heat applied by the oven to the ceramic-forming surface is of the same intensity in every portion of the heated outer layer surface. The oven box which is insulated against heat loss is preferably arranged on a support which permits movement of the oven in all directions, i.e., sideways, up and downwards, and nearer and farther from the surface of the outer layer of ceramic-forming material. Ovens of different dimensions or with other sources of heat can also be advantageously used. Good results were for instance obtained with a gas-heated muffle oven in which a fire resistant plate is arranged between the source of heat and the surface which is to be heated, so that flue gases are prevented from reaching the surface of the ceramic-forming layer.

If the material of the outer layer has a high alternating current resistance or power factor, it is also possible to use as source of heat for the fusing or vitrifying of the outer layer a generator producing high frequency electromagnetic waves. In this case a wire mesh or grid embedded in the intermediate layer may be used as one capacitor plate while the other capacitor plate is movably arranged in a position facing the outer face of the outer layer. An alternating current electrical field is then produced between the two capacitor plates and consequently also in the outer layer which thereby is heated to sintering or vitrifying temperature. A final covering acting as dielectric may be sprayed on as a metal coating or may be applied electrostatically in powder form.

In order to exclude harmful reactions between the surrounding air and the outer or intermediate layer or the materials embedded therein, it is also within the scope of the present invention to provide a protective gas layer between the source of heat and the surface of the material. The protective gases such as nitrogen or reducing gases may be blown from nozzles during and after the application of heat into the space between the source of heat and the layers on the building element so as to displace the air in this space. In order to obtain special color effect, it is also possible according to the present invention to include in the material of the outer layer chemical substances which are adapted to react with the protective gases during application of heat in such a manner as to produce the desired color effects. As to be seen in Example 1, the addition of chromium oxide produces an olive drab color. By adding a small surplus of oxygen, color will be turned more reddish and with further adding of oxygen the color will be changed into red. In controlling the atmosphere in the space between the source of heat and the outer layer relating to its contents of oxidizing or reducing agents, it is possible to produce various colors. By controlling the temperature in the said space, it is possible to obtain or avoid the separation of carbon.

It is also within the scope of the present invention to provide a heat insulating border around the area of heat application . . . consisting of asbestos rollers on the edges of the oven rolling with its move-on or consisting of a behind the oven unrolling sheet of heat resisting material. Furthermore, it is also contemplated to pass the protective gases which are heated while displacing air in the area between the source of heat and the outer layer, over areas of the outer layer which are subsequently to be sintered or vitrified, thus using the heat accumulated in the protective gases for preheating portions of the outer layer.

It is sometimes desirable to increase the amount of heat which is applied to the outer layer. Depending on the specific composition of the material of which the outer and intermediate layers are composed, the melting or sintering of the outer layer and of an engobe layer, if such engobe layer is provided, can be speeded by including in one of the layers, preferably the outer layer, a mixture of aluminum, magnesium or silicon powder and iron oxide or preferably of aluminum powder and silicon dioxide so as to induce a so-called thermic reaction whereby in an exothermic process the aluminum is oxidized and the iron oxide or silicon dioxide is reduced.

Since the ceramic-forming material contains usually aluminum and magnesium compounds, it is also possible by adding aluminum and/or magnesium powder to the ceramic-forming material to maintain an exothermic oxidation process in the ceramic-forming material, in which process silicon dioxide is reduced under formation of aluminum or magnesium oxide. The thus formed reaction products are intimately bound to each other and consequently increase the adherence of the outer and intermediate layers.

It is sometimes desirable to allow for expansion or contraction of the building element without risking a cracking of the ceramic surface layer, by providing expansion joints extending through the intermediate and outer layers. Such expansion joints are formed by arranging in the intermediate layer bands, strips or ropes of heat resistant material such as asbestos. These materials may remain in the intermediate layer, or they may also be removed prior to application of heat. Expansion joints can also be ground into the intermediate layer after the outer layer has been applied thereon.

Upon to now, designs, patterns and the like made of ceramic materials could only be formed in mosaic technique. According to the present invention and by forming expansion joints in combination with outer layers of varying colors, it is possible to form images on a building element in which the design is limited but not pierced by the expansion joints. It is also possible according to the present invention to form designs in varying colors of the outer layer and to sinter or vitrify the same without forming expansion joints, in such a manner as to produce the desired design.

The following examples are given as illustrative only of the present invention, the present invention however not being limited to the specific details of the examples.

*Example 1*

A crude masonry surface is moistened with a solution consisting of 35% by weight of potassium water glass of 40° Baumé, 15% by weight of sodium water glass of between 58 and 60° Baumé, and 50% by weight of water. Approximately 1 gram of this solution is applied to every 40 square centimeters of masonry, by dabbing the masonry surface with a thick brush containing the solution. Thereafter an intermediate layer is applied to the wetted masonry by means of a trowel. The intermediate layer consists of 50% by weight of blast furnace pumice having a particle size of up to 2 mm., 40% of chamotte having a particle size of up to 1 mm. and 10% by weight of sand (ground to a fineness of 4,900 mesh per square centimeter). 6.5 kilograms of the thus obtained dry mixture are transformed into a pasty condition by being mixed with 2.9 kilograms of a mixture consisting of 15% by weight of sodium water glass of 58–60° Baumé, 35% by weight of potassium water glass of 40° Baumé, and 50% by weight of water. The thus obtained mixture of mortar consistency is sufficient for 1 square meter of masonry surface. Thereafter a second layer is applied, consisting of about 6.5 kilograms per square meter of surface, of a mixture of 33⅓% by weight of sand ground to 4,900 mesh, 33⅓% by weight of a finely ground chamotte having particle size of up to 0.5 mm. and 33⅓% of aluminous cement, which mixture has been wetted with a solution consisting of 25% by weight of commercial potassium water glass, 25% by weight of commercial sodium water glass and 50% by weight of water, so as to obtain a mortar-like paste which can be applied to the surface with a trowel.

After these layers have hardened, an outer ceramic-forming layer is applied consisting of 550 grams per square meter of surface of a mixture comprising 19.090 parts by weight of quartz, 30,550 parts by weight of borax, 26.730 parts by weight of feldspar, 7.640 parts by weight of sodium carbonate, 7.640 parts by weight of kryolithe, 4.550 parts by weight of sodium nitrate, 3.8 parts by weight of barium carbonate. If special colors are desired, i.e. the addition of 5 parts by weight chromium oxide produces olive-drab, 1 part by weight copper oxide produces green, 0.8 part of weight cobalt oxide produces blue. This dry mixture is transformed into a pasty condition prior to application by being mixed with about 30 parts by weight of water. After this outer layer has been applied by means of a brush, the same is heated to vitrification temperature by means of a transportable gas or electrical oven. In case an iridizing outer layer is desired the following mixture is used:

75 parts by weight of a frit consisting of
   49.8% by weight red lead oxide
   18.2% by weight quartz
   16.2% by weight potash feldspar
   6.1% by weight white calcining clay
   5.3% by weight boric acid
   4.4% by weight calc-spar
25 parts by weight of a frit consisting of
   25.0% by weight red lead oxide
   23.4% by weight potash feldspar
   15.6% by weight pyrolusite
   14.1% by weight quartz
   12.5% by weight boric acid
   7.8% by weight calc-spar
   1.6% by weight white calcining clay
15 parts by weight of clay strongly ferrous
10 parts by weight of quartz
2.5 parts of cobalt oxide
2 parts of pyrolusite
0.75 part by weight of nickel oxide This glaze iridizes when fired between 980° C. and 1020° C.

In order to increase the gloss of the fired glaze, it is advantageous to heat the intermediate layer for a short period of time to about 650° C. prior to application of the outer ceramic-forming layer and to apply the glaze-forming mixture to which about 30% by weight of commercial sodium water glass has been added during the cooling of the intermediate layer.

If it is desired to subdivide the ceramic surface in individual smaller areas, ropes of organic material can be embedded in the first applied intermediate layer in such a manner that for instance squares of 6 centimeter edge length are formed. The organic material burns off during firing, forming thus canals which work as expansion joints. By omitting the last vitrifying layer and applying heat after application of the second layer, a sintered surface is obtained.

*Example 2*

A crude masonry surface is first wetted as described in Example 1. Thereafter a mixture of 60% by weight of finely ground blast furnace pumice stone having a particle size of up to 0.5 mm., 20% by weight of burnt magnesite and 20% by weight of sand ground to a fineness of 4,900 mesh per square centimeter is applied in a quantity of about 10 kilograms per square meter of masonry surface, after having first been transformed into mortar-like consistency by being mixed with 5.85 kilograms of potassium water glass of 40° Baumé. After the thus-formed intermediate layer has hardened, the outer face thereof is ground even and expansion joints extending in vertical and horiztontal direction and having a width of about 3 mm. are ground into the intermediate layer down to the surface of the masonry. Preferably, the thus-obtained squares have an edge length of for instance 8 centimeters. Asbestos ropes of 3 mm. thickness are placed into the thus-formed joints, and the entire surface area is then moistened with water. Subsequently a vitrifying layer is applied in the manner indicated in Example 1 and is heated to vitrification temperature. Especially when executing the invention in temperatures below 0° C. the mixture of the above mentioned intermediate layer is taken from its container with a trowel vibrated by a device operating i.e. with about 50 cycles per second by means of an out-of-balance force produced by a set available from the market. With said trowel, which produces drift-waves in direction towards the crude masonry surface or the support of the said intermediate layer, the intermediate layer is leveled. By these drift-waves the viscosity of the material is temporarily reduced. If drift-waves above 16,000 cycles per second (ultra sonic energy) are desired, the device acting as a trowel has to be formed like a mechanical guided plate with edges rounded off.

*Example 3*

In order to maintain a part of the porosity of crude brick masonry, the surface of the same is first wetted with a mixture consisting of 35% by weight of potassium water glass of 40° Baumé, 15% by weight of sodium water glass of 58–60° Baumé, and 50% by weight of water in such a manner as to apply 1 gram of this mixture for every 40 square centimeters of brick masonry surface. Thereafter, an intermediate layer is applied which consists for each square meter of masonry surface, of 9 kilograms of a mixture consisting of 36% by weight of pumice having particle size of up to 2 mm., 36% by weight of chamotte having a particle size of up to 1 mm., 25% by weight of sand having a particle size of up to 1 mm., and 3% by weight of bentonite. To the 9 kilograms of dry mixture are then added 5 kilograms of a mixture of 30% by weight of sodium water glass of 58–60° Baumé, and 70% by weight of potassium water glass of 40° Baumé.

An outer layer is then applied to the surface of the previously formed layer in a quantity of 4.5 kilograms per square meter. 3.4 kilograms of this outer layer consist of 33 parts by weight of glass powder, 56 parts by weight of finely ground chamotte having a particle size of up to 0.5 mm. and 11 parts by weight of flake graphite having an average particle size of about 0.75 mm. To the said 3.4 kilograms of the above mixture are then mixed with 1.1 kilograms of the glaze first described in Example 1 and with water until the consistency of a fine paste is obtained. In the above described mixture, graphite may be completely or partly replaced by aluminum powder, silicon powder or magnesium powder. The use of graphite has the advantage that the ceramic-forming mixture already possesses properties which counteract a contraction of the material and consequently contraction is considerably reduced. A further advantage of the graphite is that the reflection during the firing of the glaze is considerably increased. On the other hand, the use of aluminum powder causes a further increase in the reflection whereby however simultaneously a certain degree of porosity of the layer cannot be avoided. Consequently depending on the desired appearance of the cover layer it is possible to use either graphite or aluminum powder or also a mixture of both.

It is also possible in the present example to grind expansion joints into the surface layers such as has been described in Example 2 and to place ropes of fire resistant material into the thus formed grooves. Subsequently, the entire surface is covered with a glaze as described in Example 1. The ropes are removed prior to the heating of the surface area, so that clearly visible joints are obtained, which after the firing may be filled with a mortar or marble cement so as to achieve an appearance similar to that of finished brick masonry.

*Example 4*

After applying an intermediate layer as described in Example 2, the outline of a design is ground into the same in such a manner that preferably any continuous area does not exceed the size of 35 square centimeters. Thereafter the ground joints are filled as described in Example 3. In order to obtain varicolored designs, differently colored portions of the outer layers (by use of different ceramic color bodies) are applied into which, in order to obtain special light and color effects, small spheres of high melting glass are embedded in such a manner that portions of the spheres, up to half spheres protrude outwardly from the surface layer. The surface layer is then vitrified as described in the previous examples. This can be accomplished either by means of the electric oven illustrated in the drawing or by means of a gas oven the waste gases of which may be used for drying portions of the outer layer prior to vitrifying or sintering the same.

As previously stated the means for applying heat to the ceramic-forming layers may be of any suitable construction and type such as electric resistant heaters, radiation heaters, convection heaters or the heat may be applied by forming a high frequency field in the layer of ceramic-forming material.

The ceramic surface which is formed by applying at least an intermediate and an outer layer to a building element may be formed, according to the present invention, at the final location of the building element such as a wall or other structure. This is an important advantage of the method of the present invention since very considerable savings on costs and labor as well as transportation can be achieved thereby. The filler material in the second ceramic forming material may be aligned by conventional mechanical, electrical or magnetic methods prior to or during the heating of the outer layer.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of forming on a support a ceramic surface layer, comprising, in combination, the steps of applying to the surface of said support at least one intermediate layer adapted to harden upon standing at ambient temperature and comprising a first ceramic-forming material containing at least one preburned ceramic material thereby adhering said intermediate layer to said surface of said support; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said support.

2. A method according to claim 1 in which the surface of at least one of the said layers is smoothened by grinding.

3. A method according to claim 1 in which expansion joints are formed in at least one of the layers by grinding.

4. A method of forming on a building element a ceramic surface layer, comprising, in combination, the steps of applying to the surface of said building element at least one intermediate layer adapted to harden upon standing at ambient temperature and comprising a first ceramic-forming material and a filler material including at least one preburned material distributed therethrough thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

5. A method of forming on a building element a ceramic surface layer, comprising, in combination, the steps of applying to the surface of said building element at least one intermediate layer adapted to harden upon standing at ambient temperature and comprising a first ceramic-forming material and a filler material including at least one preburned material distributed therethrough thereby adhering said intermediate layer to said surface of said building element; allowing said intermediate layer to harden without heating the same; applying to the outer face of said intermediate layer an outer layer of a second ceramic-forming material adapted to be at least sintered by heating; and applying heat to at least the outer face of said outer layer so as to at least sinter the same, however, substantially without causing liquefaction of said intermediate layer, whereby said outer layer is firmly adhered to said intermediate layer and simultaneously a ceramic surface is formed on said building element.

6. A method of forming on a building element a ceramic surface layer, comprising, in combination, the steps of applying to the surface of said building element at least one intermediate layer adapted to harden upon standing at ambient temperature and comprising a first ceramic-forming material including water glass and a filler material including a preburned material of low heat conductivity distributed therethrough, thereby adhering said intermediate layer to said surface of said building element; allowing said intermediate layer to harden without heating the same; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

7. A method of forming on a building element a ceramic surface layer, comprising, in combination, the steps of applying to the surface of said building element at least one intermediate layer adapted to harden upon standing at ambient temperature and comprising a first ceramic-forming material including water glass and a filler material including a preburned material of low heat conductivity and belonging to the group consisting of basalt, pumice, trachyte and blast furnace pumicestone slag distributed therethrough, thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

8. A method of forming on a building element a ceramic surface layer, comprising, in combination, the steps of applying to the surface of said building element at least one intermediate layer adapted to harden upon standing at ambient temperature and comprising a first ceramic-forming material including water glass, a filler material including a preburned material of low heat conductivity and at least one substance belonging to the group consisting of metals and metal compounds, thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

9. A method of forming on a building element a ceramic surface layer, comprising, in combination, the steps of applying to the surface of said building element at least one intermediate layer adapted to harden upon standing at ambient temperature and comprising a first ceramic-forming material including water glass, a filler material including a preburned material of low heat conductivity and at least one substance belonging to the group consisting of asbestos, graphite and vermiculite, thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

10. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough thereby adhering said intermediate layer to said surface of said building element; allowing said intermediate layer to harden without heating the same; applying to the outer face of said intermediate layer an outer layer of a second ceramic-forming material adapted to be at least sintered by heating; and positioning a transportable heating device in a position relative to said building element so as to subject said outer layer to heat emanating from said heating device thereby at least sintering said outer layer, however, substantially without causing liquefaction of said intermediate layer, whereby said outer layer is firmly adhered to said intermediate layer and simultaneously a ceramic surface is formed on said building element.

11. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough thereby adhering said intermediate layer to said surface of said building element; allowing said intermediate layer to harden; applying to the outer face of said intermediate layer an outer layer of a second ceramic-forming material adapted to be at least sintered by heating and having distributed therethrough at least one filler material belonging to the group consisting of metals, metal compounds and refractory materials; and heating said outer layer so as to at least sinter the same, however, substantially without causing liquefaction of said intermediate layer, whereby said outer layer is firmly adhered to said intermediate layer and simultaneously a ceramic surface is formed on said building element.

12. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough, thereby adhering said intermediate layer to said surface of said building element; allowing said intermediate layer to harden; applying to the outer face of said intermediate layer an outer layer of a second ceramic-forming material adapted to be at least sintered by heating and having asbestos distributed therethrough; and heating said outer layer so as to at least sinter the same, however, substantially without causing liquefaction of said intermediate layer, whereby said outer layer is firmly adhered to said intermediate layer and simultaneously a ceramic surface is formed on said building element.

13. A method of forming on a building material a ceramic surface layer, comprising, in combination, the steps of applying to the surface of said building material at least one intermediate layer adapted to harden upon standing at ambient temperature and comprising a first ceramic-forming material including water glass and a filler material including blast furnace pumicestone slag and sand, thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer, whereby said outer layer is firmly adhered to said intermediate layer and simultaneously a ceramic surface is formed on said building element.

14. A method according to claim 13 in which said first ceramic-forming material consists at least partly of cement resisting to temperatures of more than 800° C.

15. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough, thereby adhering said intermediate layer to said surface of said building element; allowing said intermediate layer to harden; applying to the outer face of said intermediate layer an outer layer of a glaze-forming material adapted to be at least sintered by heating; and heating said outer layer so as to form a glaze, however, substantially without causing liquefaction of said intermediate layer, whereby said outer layer is firmly adhered to said intermediate layer and simultaneously a ceramic surface is formed on said building element.

16. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough, thereby adhering said intermediate layer to said surface of said building element; allowing said intermediate layer to harden; applying an engobe coating to the outer face of said intermediate layer; applying to the outer face of said engobe coating an outer layer of a second ceramic-forming material adapted to be at least sintered by heating; and heating said outer layer so as to at least sinter the same, however, substantially without causing liquefaction of said intermediate layer, whereby said outer layer is firmly adhered to said engobe coating and to said intermediate layer and simultaneously a ceramic surface is formed on said building element.

17. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough, thereby adhering said intermediate layer to said surface of said building element; allowing said intermediate layer to harden; applying to the outer face of said intermediate layer an outer layer of a second ceramic-forming material having a low melting point; and heating said outer layer so as to at least sinter the same, however, substantially without causing 18. A method of forming on a support a ceramic surface layer comprising, in combination, the steps of applying to the surface of said support at least one intermediate layer adapted to harden upon standing at ambient temperature and comprising a first ceramic-forming material containing a preburned ceramic material thereby adhering said intermediate layer to said surface of said support; allowing said intermediate layer to harden without heating the same; placing on said intermediate layer a foraminous electrical condenser; applying to the outer face of said intermediate layer and said foraminous electrical condenser an outer layer of a second ceramic-forming material adapted to be at least sintered by heating; forming an electromagnetic high frequency field between a generator and said condenser thereby heating said outer layer so as to at least sinter the same, however, substantially without causing liquefaction of said intermediate layer, whereby said outer layer is firmly adhered to said intermediate layer and simultaneously a ceramic surface is formed on said support.

19. A method of forming on a building element a ceramic surface layer, comprising, in combination, the steps of applying to the surface of said building element at least one intermediate layer adapted to harden upon standing at ambient temperature and comprising a first ceramic-forming material and a filler material including a preburned material distributed therethrough, thereby adhering said intermediate layer to said surface of said building element; allowing said intermediate layer to harden; applying to the outer face of said intermediate layer an outer layer of a second ceramic-forming material adapted to be at least sintered by heating; and heating said outer layer so as to at least sinter the same, however, substantially without causing liquefaction of said intermediate layer while passing a protective gas over the outer face of said outer layer, whereby said outer layer is firmly adhered to said intermediate layer and simultaneously a ceramic surface is formed on said building element.

20. A method of forming on a support a ceramic surface layer, comprising in combination, the steps of applying to the surface of said support at least one intermediate layer adapted to harden upon standing at ambient temperature and comprising a first ceramic-forming material including a preburned material, thereby adhering said intermediate layer to said surface of said support; allowing said intermediate layer to harden; applying to the outer face of said intermediate layer an outer layer of a second ceramic-forming material adapted to be at least sintered by heating; placing on said support and extending through said intermediate layer and through said outer layer elongated dividing members of relatively small width, said placing of said dividing members being performed in any desired sequence relative to the applying of said layers; and heating said outer layer so as to at least sinter the same, however, substantially without causing liquefaction of said intermediate layer, whereby said outer layer is firmly adhered to said intermediate layer and simultaneously a ceramic surface divided by said dividing members is formed on said support.

21. A method according to claim 20 in which said dividing members are removed prior to the heating of said outer layer.

References Cited in the file of this patent

UNITED STATES PATENTS

| Number | Name | Date |
|---|---|---|
| 406,563 | Catlin | July 9, 1889 |
| 479,021 | Rue | July 19, 1892 |
| 1,158,417 | Dennison | Oct. 26, 1915 |
| 1,195,978 | Clayton | Aug. 29, 1916 |
| 1,207,858 | Carmichael | Dec. 12, 1916 |
| 1,456,303 | Ekstrom | May 22, 1923 |
| 1,693,252 | Prouty | Nov. 27, 1928 |
| 1,862,066 | Skillin | June 7, 1932 |
| 2,004,632 | Martin | June 11, 1935 |
| 2,021,820 | Nowak | Nov. 19, 1935 |
| 2,146,858 | Scott | Feb. 14, 1939 |
| 2,320,099 | Ramsay | May 25, 1943 |
| 2,360,893 | Robinson | Oct. 24, 1944 |
| 2,406,534 | Fetterolf | Aug. 27, 1946 |
| 2,569,956 | Schiltknecht | Oct. 2, 1951 |
| 2,579,050 | Ramsay | Dec. 18, 1951 |
| 2,708,172 | Robson et al. | May 10, 1955 |
| 2,813,305 | Robson et al. | Nov. 19, 1957 |
| 2,930,106 | Wrotnowski | Mar. 29, 1960 |